United States Patent
Odamura

(10) Patent No.: US 6,763,248 B1
(45) Date of Patent: Jul. 13, 2004

(54) RADIO NETWORK COMMUNICATION SYSTEM

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 664 days.

(21) Appl. No.: 09/717,885

(22) Filed: Nov. 21, 2000

(30) Foreign Application Priority Data

Nov. 26, 1999 (JP) .......................................... 11-335857

(51) Int. Cl.[7] .......................................... G06F 17/30
(52) U.S. Cl. ...................... 455/557; 455/453; 455/433; 455/553; 709/216; 709/217; 709/218
(58) Field of Search ................................. 455/557, 433, 455/553, 522, 453; 709/216, 217, 218, 223, 206, 225; 718/105

(56) References Cited

U.S. PATENT DOCUMENTS

| | | | |
|---|---|---|---|
| 5,564,046 A | | 10/1996 | Nemoto et al. |
| 6,047,327 A | * | 4/2000 | Tso et al. .................... 709/232 |
| 6,484,205 B1 | * | 11/2002 | Byford ........................ 709/227 |
| 6,567,382 B1 | * | 5/2003 | Cox ............................ 370/255 |
| 2001/0022615 A1 | * | 9/2001 | Fernandez et al. ........... 348/143 |
| 2002/0181394 A1 | * | 12/2002 | Partain et al. ............... 370/229 |

FOREIGN PATENT DOCUMENTS

| | | |
|---|---|---|
| JP | 10-171702 | 6/1998 |
| JP | 11-212889 | 8/1999 |
| JP | 2000-228644 | 8/2000 |

* cited by examiner

*Primary Examiner*—Nay Maung
*Assistant Examiner*—Alan T. Gantt
(74) *Attorney, Agent, or Firm*—Scully, Scott, Murphy & Presser

(57) ABSTRACT

A radio network communication system includes (a) at least one server storing files therein, (b) at least one client terminal making a request to download a desired file thereto among the files stored in the server, and (c) at least one base station. The base station includes (c1) a data transceiver which makes radio-communication with the client terminal to receive data from and transmit data to the client terminal, and which, when the request is made by the client terminal, transmits the request to the server and receives all data constituting the desired file, from the server, and (c2) a load measurement unit which measures a network load between the client terminal and the base station. The base station divides the received file into sub-files in accordance with the load measured by the load measurement unit, and transmits each of the sub-files to the client terminal.

23 Claims, 15 Drawing Sheets

FIG. 8

```
                                              321
<!DOCTYPE HTML PUBLIC "-//W3C//DTD W3 HTML 3.2//EN">
<HTML>
<HEAD>
<TITLE>Welcome</TITLE>
<META HTTP-EQUIV="Content-Type" content="text/html; charset=x-sji
s">
</HEAD>
<BODY BGCOLOR="#FFFFFF" TEXT="#000000">
1ABCDEFGHIJKLM<BR>
2<BR>
 . . . . . . .
27<BR>
28<BR>
</BODY>
</HTML>
```

FIG. 9

```
323   <! START PAGE>
      <!DOCTYPE HTML PUBLIC "-//W3C//DTD W3 HTML 3.2//EN">
      <HTML>
      <HEAD>
      <TITLE>Welcome</TITLE>
      <META HTTP-EQUIV="Content-Type" content="text/html; charset=x-sji
      s">
      </HEAD>
      <BODY BGCOLOR="#FFFFFF" TEXT="#000000">
      1ABCDEFGHIJKLM<BR>
      2<BR>
       . . . . . . .
      8<BR>
      9<BR>
      </BODY>
      </HTML>
324   <! NEXT PAGE=2>
```

```
325  <! PREVIOUS PAGE=1>                                    322₂
     <!DOCTYPE HTML PUBLIC "-//W3C//DTD W3 HTML 3.2//EN">
     <HTML>
     <HEAD>
     <TITLE>Welcome</TITLE>
     <META HTTP-EQUIV="Content-Type" content="text/html; charset=x-sji
     s">
     </HEAD>
     <BODY BGCOLOR="#FFFFFF" TEXT="#000000">
     10<BR>
     11<BR>
     . . . . . . .
     18<BR>
     19<BR>
     </BODY>
     </HTML>
326  <! NEXT PAGE=3>
```

FIG. 11

```
<! PREVIOUS PAGE=2>
<!DOCTYPE HTML PUBLIC "-//W3C//DTD W3 HTML 3.2//EN">
<HTML>
<HEAD>
<TITLE>Welcome</TITLE>
<META HTTP-EQUIV="Content-Type" content="text/html; charset=x-sji
s">
</HEAD>
<BODY BGCOLOR="#FFFFFF" TEXT="#000000">
20 <BR>
21<BR>
 . . . . . . .
27<BR>
28<BR>
</BODY>
</HTML>
<! END PAGE>
```

RADIO NETWORK COMMUNICATION SYSTEM

BACKGROUND OF THE INVENTION

1. Field of the Invention

The invention relates to a radio network communication system in which a radio communication terminal such as a cellular phone, and more particularly to such a radio network communication system suitable for transmitting a larger amount of data to a plurality of radio communication terminals.

2. Description of the Related Art

There is widely used a handy radio communication terminal such as a personal digital cellular (PDC), a personal handy phone system (PHS) or a handy communication terminal including a radio modem. Among such handy radio communication terminals, a cellular phone such as PDC or PHS has been first used as a small-sized telephone. However, as multi-media communication has developed, they are used also in a field of data communication, for instance, they are used for transmitting and receiving electronic mails.

In particular, an internet is frequently used in a lot of homes as well as in a lot of offices, resulting in a remarkable increase in an access by a user of a radio communication terminal to a world wide web (WWW) from a place remote from an office and a home. Accordingly, a handy radio communication terminal is, now designed to include a software for making access to a World Wide Web, ensuring that a user can make access to and observer a desired homepage.

A homepage is made of a content which is called a hypertext. A hypertext is designed to allow a text, a still picture, a moving picture and voices in a hypertext to link to an object including associated data. Hence, selecting a certain word in a hypertext, which links to other data, it would be possible to retrieve and display data associated with the word.

As a hypertext, there are a hypercard, a hypertext markup language (HTML), and so on.

A presently available radio communication terminal has a quite low communication rate in comparison with an access rate at which an access is made to a homepage through a telephone network or CATV (cable television). Hence, there has been suggested a radio network communication system which allows a handy radio communication terminal to readily download a hypertext including pages having a still picture, a moving picture and/or voices.

For instance, Japanese Unexamined Patent Publication No. 10-171702 has suggested a communication terminal which enhances a response rate at which a page is switched to a next page while the terminal is making access to a homepage.

In the suggested communication terminal, names of a server and a directory in a presently displayed page are identified, and then, an associated HTML file located at a lower layer is retrieved in series, based on the identified names. Then, the thus retrieved HTML file is stored in a memory. When a homepage reader turns a page, a HTML file associated with the next page is read out of the memory, and the thus read-out HTML file is displayed at a display unit. As a result, a response rate for displaying a HTML file can be enhanced.

In the above-mentioned Japanese Unexamined Patent Publication No. 10-171702, HTML files are retrieved in series, and then, stored in a memory. Accordingly, it is necessary to store pages having a small possibility to be displayed, in a memory, in order to swiftly display a requisite page. Hence, the communication terminal suggested in the Publication is suitable for a relatively large-sized communication terminal including a memory having a sufficient capacity, and having a sufficient communication rate.

However, the communication terminal is accompanied with a problem that the communication terminal has to download data which will not be used.

To solve this problem, Japanese Unexamined Patent Publication No. 11-212889 has suggested a communication terminal which reduces not only a load of displaying data, but also a load of downloading data.

FIG. 1 is a block diagram of the suggested communication terminal.

The communication terminal 100 is comprised of a reader 102 to which a communication line 101 is connected, a memory 103, a hypertext analyzer 104 including an image file reader 106, an image developer 107, a layout designer 108, and a display unit 109.

The reader 102 reads out a hypertext transmitted through the communication line 101. The thus read-out hypertext is stored in the memory 103. The hypertext analyzer 104 analyzes the hypertext stored in the memory 103, and reads out data by which an image file is defined, stored in the hypertext. Then, the hypertext analyzer 104 determines whether the image file is read out from a server (not illustrated).

When the image file is to be read out, the image file reader 106 does so, and the image developer 107 develops the thus read-out image file. The layout designer 108 designs a layout, based on the data analyzed by the hypertext analyzer 104. The display unit 109 displays data formed based on the layout designed by the layout designer 108.

The hypertext analyzer 104 determines whether the image file is read out from a server, in accordance with whether a file of the image data to be read out is greater in a size than a threshold size. When the image file is not to be read out, an eye-con is displayed in place of the image file at a place where the image file was to be displayed.

Japanese Unexamined Patent Publication No. 11-212889 has made suggestions other than the communication terminal illustrated in FIG. 1. For instance, whether an image file is to be read out is determined in accordance with presence or absence of a link as well as a size of an image file. As an alternative, whether an image file is to be read out is determined, based on a capacity at which a display unit of a receiver terminal displays data.

In the communication terminal illustrated in FIG. 1, a load of the communication terminal 100 is reduced in accordance with a status of the communication terminal 100 acting as a data receiver, ensuring that received data can be effectively displayed.

In a radio network communication. system in which a radio communication terminal such as the communication terminal 100 is used, a load of a communication network as well as a load of a radio communication terminal has to be considered.

For instance, in a cellular phone system, base stations are positioned to cover a relatively small area in order to effectively utilize a limited number of frequencies. Frequencies are assigned to cellular phones such that frequencies are not interfered with each other in adjacent areas, and those frequencies are repeatedly used.

In addition, a frequency is divided into a plurality of frequencies by time division to use in a plurality of channels. In general, if a channel is defined for a frequency band, it would be possible to increase an amount of data transmittable per a unit time. However, it would be unavoidable that the number of channels is reduced accordingly, and hence, the number of users per a unit area is unavoidably reduced.

As a result, there exists an optimal number of communication terminals which can be connected to a, channel or which can concurrently make radio communication, in a radio network communication system in which a radio communication terminal such as PDC, PHS, or a handy communication device including a radio modem is used. Hence, if the system illustrated in FIG. 1, which is supposed to be used as a non-radio communication system, is applied to a radio network communication system, though respective communication terminals might operate well, the radio network communication system does not operate well, or some communication terminals might not be able to operate.

That is, even if a communication terminal to which a homepage is downloaded had a high capacity for displaying data, or could process images at a high rate, the communication terminal may occupy network resources more than necessary, resulting in that other communication terminals cannot make radio communication well.

SUMMARY OF THE INVENTION

In view of the above-mentioned problems in the prior art, it is an object of the present invention to provide a radio network communication system which is capable of enhancing a communication efficiency not only in a communication terminal but also in a base station making radio communication with communication terminals.

In one aspect of the present invention, there is provided a radio network communication system including (a) at least one server storing files therein, (b) at least one client terminal making a request to download a desired file thereto among the files stored in the server, and (c) at least one base station including (c1) a data transceiver which makes radio-communication with the client terminal to receive data from and transmit data to the client terminal, and which, when the request is made by the client terminal, transmits the request to the server and receives all data constituting the desired file, from the server, and (c2) a load measurement unit which measures a network load between the client terminal and the base station, the base station dividing the received file into sub-files in accordance with the load measured by the load measurement unit, and transmitting each of the sub-files to the client terminal.

In the above-mentioned radio network communication system, the base station is designed to include a load measurement unit for measuring a load between the client terminal and the base station. A file which the client terminal requests to download thereto is first stored in the base station, and the base station divides the file into sub-files and transmits the sub-file or sub-files to the client terminal in accordance with a load measured by the load measurement unit.

Accordingly, the above-mentioned radio network communication system can solve the problem that a certain client terminal occupies a channel.

Furthermore, when a client terminal requests the same file to download thereto again, since the base station has already stored the file therein, the base station can transmit the requested file to the client terminal without requesting the server to transmit the file to the base station.

Since the base station transmits the divided files or sub-files to the client terminal, if the client terminal checks a first transmitted sub-file and determines that the rest of sub-files are not necessary to be transmitted thereto, it is not necessary to download the entire file. This ensures that a load on a network can be reduced in comparison with the conventional radio network communication system in which a file was downloaded in its entirety to a client terminal.

There is further provided a radio network communication system including (a) at least one server storing therein files each constituting a homepage, the files being stored in association with a uniform resource locator (URL) indicating a site of the homepage in an internet, (b) at least one client terminal making a request to download a desired file thereto among the files stored in the server, by indicating a uniform resource locator of the desired file, and (c) at least one base station including (c1) a data transceiver which makes radio-communication with the client terminal to receive data from and transmit data to the client terminal, and which, when the request is made by the client terminal, transmits the request to the server and receives all data constituting the desired file, from the server, and (c2) a load measurement unit which measures a network load between the client terminal and the base station, the base station dividing the received file into sub-files in accordance with the load measured by the load measurement unit, and transmitting each of the sub-files to the client terminal.

In the above-mentioned radio network communication system, the base station is designed to include a load measurement unit for measuring a load between the client terminal and the base station. A file corresponding to URL of a homepage which the client terminal requests to download thereto is first stored in the base station, and the base station divides the file into sub-files and transmits the sub-file or sub-files to the client terminal in accordance with a load measured by the load measurement unit.

Accordingly, the above-mentioned radio network communication system can solve the problem that a certain client terminal occupies a channel.

Furthermore, when a client terminal requests the same file to download thereto again, since the base station has already stored the file therein, the base station can transmit the requested file to the client terminal without requesting the server to transmit the file to the base station.

Since the base station transmits the divided files or sub-files to the client terminal, if the client terminal checks a first transmitted sub-file and determines that the rest of sub-files are not necessary to be transmitted thereto, it is not necessary to download the entire file. This is quite effective, taking into consideration that a user doing net-surfing frequently makes access to a second homepage before he/she finishes reading a first homepage.

It is preferable that the files are described in a descriptive language in which a homepage should be described, and that the base station further includes (c3) a database storing therein data about a range in which a display unit of the client terminal can display data at a time, (c4) a divider which divides the received file into sub-files in the unit of a page, and (c5) an editor which edits the sub-files such that a descriptive language in each of the sub-files properly forms a page.

In accordance with the above-mentioned radio network communication system, data is displayed in the client terminal by pages by means of the database storing therein data about a range in which a display unit of the client terminal can display data at a time. Hence, the client terminal can reduce data transmitted at a time from the base station, without feeling incompatibility in displaying data.

In addition, even if a file is described in HTML data, the editor edits respective pages, when the file is divided into pages, such that each of pages have indications indicative of a leading edge or a trailing edge. Hence, the client terminal can display the thus edited pages as they are.

Furthermore, when the client terminal requests the base station to transmit a new page thereto, since data about a presently displayed page is known, the client terminal can receive HTML data from the base station by indicating a desired page.

It is preferable that the base station further includes a transmitter which transmits the sub-files to the client terminal by pages applicable to a client terminal, in accordance with the network load measured by the load measurement unit.

The transmitter makes it possible for the base station to transmit data to a client terminal by every two or more pages, when a smaller load is exerted on a network than a load exerted on a network when data is transmitted by respective pages. This ensures more effective data transmission.

It is preferable that the base station transmits the received files to the client terminal at a time, when the network load measured by the load measurement unit is equal to or smaller than a threshold load.

When a load between a client terminal and a base station is quite small, for instance, when client terminals belonging to the same channel in the same base station do not concurrently make access to a homepage, data may be transmitted at a time from a base station to a client terminal, ensuring that a file can be downloaded optimally under certain conditions.

It is preferable that the client terminal includes (b1) a detector which detects a request to display new pages on a display unit, and (b2) a transmitter which transmits the request to the base station.

When the detector detects a request to display a new page or pages on a display unit of a client terminal, the transmitter transmits the request to a base station. In response, the base station transmits the requested data to the client terminal, which ensures that a load on a network can be dispersed.

There is still further provided a radio network communication system including (a) an internet network, (b) first to N-th servers each storing homepages therein and each being in communication with the internet network, wherein N is an integer equal to or greater than 2, (c) first to M-th base stations each being in communication with the internet network, wherein M is an integer equal to or greater than 2, each of the first to M-th base stations including a memory to store data received from the servers therein, (d) client terminals each of which is accessible to the internet network through one of the base stations, each of the first to M-th base stations, on receiving a request from one of the client terminals to download a desired homepage to the one of the client terminals, receiving data from the associated server, and storing the thus received data in the memory, each of the first to M-th base stations calculating a load between itself and the one of the client terminals, and transmitting the data to the one of the client terminals by pages in accordance with the load.

In another aspect of the present invention, there is provided a method of downloading data to a client terminal in a radio network communication system including at least one server, at least one client terminal and at least one base station, including the steps of (a) the client terminal making a request to download a desired file thereto among the files stored in the server, (b) the base station receiving all data constituting the desired file, from the server, (c) calculating a network load between the client terminal and the base station, (d) the base station dividing the received file into sub-files in accordance with the load calculated in the step (c), and (e) the base station transmitting each of the sub-files to the client terminal.

There is further provided a method of downloading data to a client terminal in a radio network communication system including at least one server, at least one client terminal and at least one base station, including the steps of (a) the client terminal making a request to download a desired file thereto among the files stored in the server, by indicating a uniform resource locator (URL) of the desired file, (b) the base station receiving all data constituting the desired file, from the server which stores files each constituting a homepage, the files being stored in association with a uniform resource locator (URL) indicating a site of the homepage in an internet, (c) calculating a network load between the client terminal and the base station, (d) the base station dividing the received file into sub-files in accordance with the load calculated in the step (c), and (e) the base station transmitting each of the sub-files to the client terminal.

It is preferable that the files are described in a descriptive language in which a homepage should be described, and that the method further includes the steps of the base station storing therein data about a range in which a display unit of the client terminal can display data at a time, the base station dividing the received file into sub-files in the unit of a page, and the base station editing the sub-files such that a descriptive language in each of the sub-files properly forms a page.

It is preferable that the method further includes the step of the base station transmitting the sub-files to the client terminal by pages applicable to a client terminal, in accordance with the network load calculated in the step (c).

It is preferable that the base station transmitting the received files to the client terminal at a time, when the network load is equal to or smaller than a threshold load.

It is preferable that the method further includes the step of the client terminal detecting a request to display new pages on a display unit, and transmitting the request to the base station.

There is still further provided a method of downloading data to a client terminal in a radio network communication system including at least one server, at least one client terminal and at least one base station, including the steps of (a) a user of the client terminal making a request to access to a homepage, (b) the server transmitting data to the base station in accordance with the request, (c) the base station storing the data in a memory, (d) the base station calculating a network load between the base station and the client terminal, (e) calculating an amount of data transmittable to the client terminal, in accordance with the load, (f) comparing the data calculated in the step (e) to the data stored in the memory in the step (c), and (g) the base station transmitting the data to the client terminal, if an excessive load is not exerted on an internet network even if the data stored in the memory is transmitted to the client terminal at a time.

It is preferable that the method further includes the step of determining the number of pages transmittable to the client terminal at a time, the base station transmitting the pages to the client terminal in the step (g).

There is yet further provided a method of downloading data to a client terminal in a radio network communication system including at least one server, at least one client terminal and at least one base station, including the steps of (a) a user of the client terminal making a request to access to a homepage, (b) the server transmitting data to the base station in accordance with the request, (c) the base station storing the data in a memory, (d) the base station calculating a network load between the base station and the client terminal, (e) calculating an amount of data transmittable to the client terminal, in accordance with the load, (f) comparing the data calculated in the step (e) to the data stored in the memory in the step (c), (g) the base station editing a first page in accordance with a capacity at which the client terminal can display data at a time on a display unit thereof, if the data stored in the memory in the step (c) is greater in an amount than the data calculated in the step (e), and (h) the base station transmitting the first page to the client terminal.

It is preferable that the method further includes the steps of (h) editing a second and later pages on receipt of a request from the client terminal, and (i) the base station transmitting the thus edited second or later pages to the client terminal.

There is further provided a method of downloading data to a client terminal in a radio network communication system including at least one server, at least one client terminal and at least one base station, including the steps of (a) a user of the client terminal making a request to access to a homepage, (b) the server transmitting data to the base station in accordance with the request, (c) the base station storing the data in a memory, (d) the base station calculating a network load between the base station and the client terminal, (e) calculating an amount of data transmittable to the client terminal, in accordance with the load, (f) comparing the data calculated in the step (e) to the data stored in the memory in the step (c), (g) the base station editing a first page in accordance with a capacity at which the client terminal can display data at a time on a display unit thereof, if the data stored in the memory in the step (c) is greater in an amount than the data calculated in the step (e), (h) the base station transmitting the first page to the client terminal, (i) repeating the steps (d) to (f), when the client terminal requests the base station to transmit the client terminal data for next pages, and (j) the base station transmitting the data for next pages to the client terminal, if an excessive load is not exerted on an internet network even if the data for next pages is transmitted to the client terminal at a time.

It is preferable that the method further includes the step of determining the number of pages transmittable to the client terminal at a time, the base station transmitting the pages to the client terminal in the step (j).

There is further provided a method of downloading data to a client terminal in a radio network communication system including at least one server, at least one client terminal and at least one base station, including the steps of (a) a user of the client terminal making a request to access to a homepage, (b) the server transmitting data to the base station in accordance with the request, (c) the base station storing the data in a memory, (d) the base station calculating a network load Dmax per a channel between the base station and the client terminal, (e) the base station calculating an allowable load per a client terminal at the channel, (f) the base station comparing Dk to the number of pages N of a homepage which the client terminal requests to download therein, wherein Dk is defined as follows:

$$Dk = Dmax/K$$

wherein K indicates the number of client terminals concurrently making access to a homepage, and (g) the base station transmitting all data of the homepage to the client terminal, if Dk is equal to or greater than N ($Dk \geq N$).

There is further provided a method of downloading data to a client terminal in a radio network communication system including at least one server, at least one client terminal and at least one base station, including the steps of (a) a user of the client terminal making a request to access to a homepage, (b) the server transmitting data to the base station in accordance with the request, (c) the base station storing the data in a memory, (d) the base station calculating a network load Dmax per a channel between the base station and the client terminal, (e) the base station calculating an allowable load per a client terminal at the channel, (f) the base station comparing Dk to the number of pages N of a homepage which the client terminal requests to download therein, wherein Dk is defined as follows:

$$Dk = Dmax/K$$

wherein K indicates the number of client terminals concurrently making access to a homepage, and (g) the base station transmitting data of the homepage by every M pages to the client terminal, if Dk is smaller than N, but equal to or greater than N/M ($N > Dk \geq N/M$), wherein M is an integer equal to or greater than 2 and smaller than the N.

There is further provided a method of downloading data to a client terminal in a radio network communication system including at least one server, at least one client terminal and at least one base station, including the steps of (a) a user of the client terminal making a request to access to a homepage, (b) the server transmitting data to the base station in accordance with the request, (c) the base station storing the data in a memory, (d) the base station calculating a network load Dmax per a channel between the base station and the client terminal, (e) the base station calculating an allowable load per a client terminal at the channel, (f) the base station comparing Dk to the number of pages N of a homepage which the client terminal requests to download therein, wherein Dk is defined as follows:

$$Dk = Dmax/K$$

wherein K indicates the number of client terminals concurrently making access to a homepage, and (g) the base station transmitting data of the homepage by every L pages to the client terminal, if Dk is smaller than N/M, but equal to or greater than 1 ($N/M > Dk \geq 1$), wherein M is an integer equal to or greater than 2 and smaller than the N, and L indicates an integer smaller than the M.

There is further provided a method of downloading data to a client terminal in a radio network communication system including at least one server, at least one client terminal and at least one base station, including the steps of (a) a user of the client terminal making a request to access to a homepage, (b) the server transmitting data to the base station in accordance with the request, (c) the base station storing the data in a memory, (d) the base station calculating a network load Dmax per a channel between the base station and the client terminal, (e) the base station calculating an allowable load per a client terminal at the channel, (f) the base station comparing Dk to the number of pages N of a homepage which the client terminal requests to download therein, wherein Dk is defined as follows:

$$Dk = Dmax/K$$

wherein K indicates the number of client terminals concurrently making access to a homepage, and (g) the base station transmitting data of the homepage by every one page to the client terminal, if Dk is smaller than 1.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 8 illustrates an example of HTML data stored in the first server.

FIG. 9 illustrates HTML data at the first page after a file was divided into sub-files or pages.

FIG. 10 illustrates HTML data at the second page after a file was divided into sub-files or pages.

FIG. 11 illustrates HTML data at the third page after a file was divided into sub-files or pages.

DESCRIPTION OF THE PREFERRED EMBODIMENTS

Preferred embodiments in accordance with the present invention will be explained hereinbelow with reference to drawings.

Figure 1:
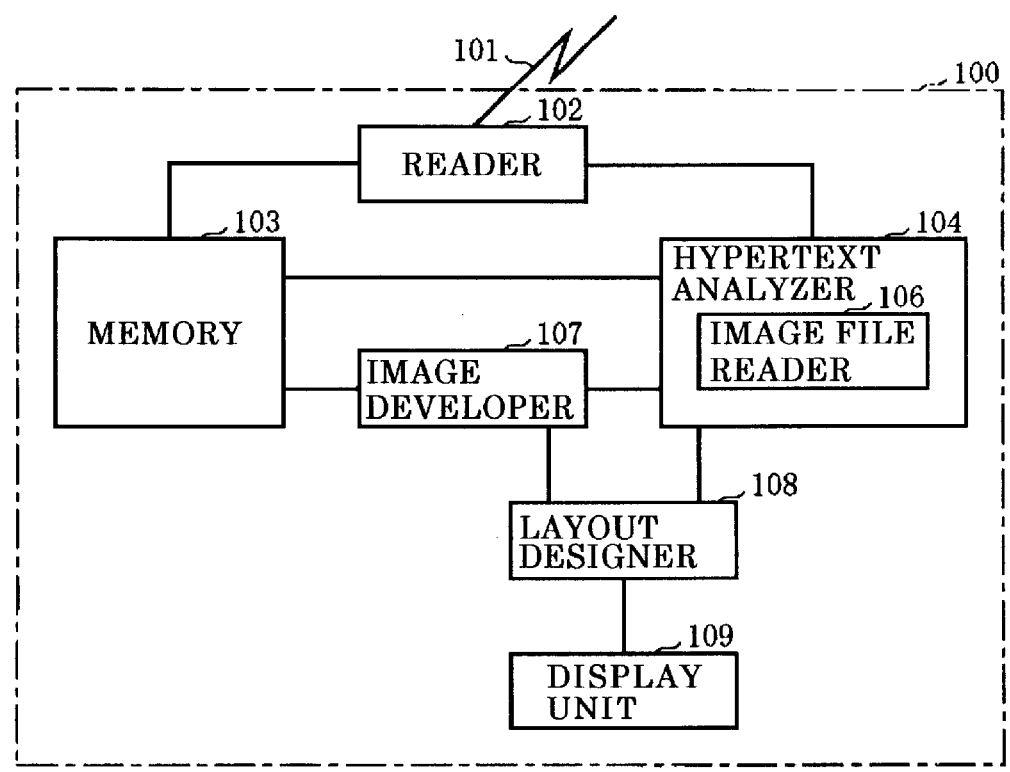
FIG. 1 is a block diagram of a communication terminal accessible to an internet, used in a conventional radio network communication system.
Figure 2:
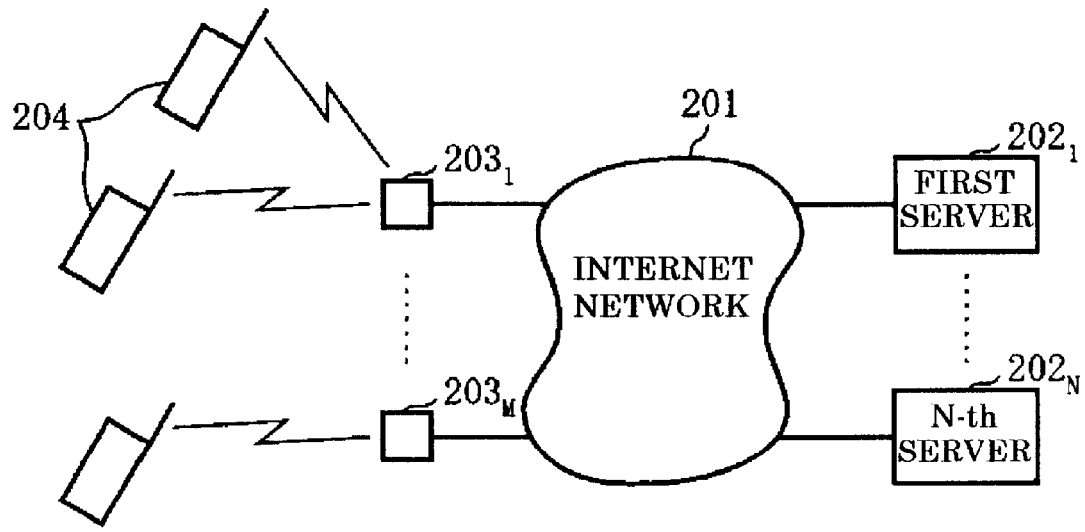
FIG. 2 is a block diagram of a radio network communication system in accordance with a preferred embodiment of the present invention.

FIG. 2 illustrates a radio network communication system in accordance with a preferred embodiment of the present invention.

The radio network communication system is comprised of an internet network 201, first to N-th servers $202_1$ to $202_N$ each connected to the internet network 201 through a communication cable such as a telephone line, and first to M-th base stations $203_1$ to $203_M$ each connected to the internet network 201 through a communication cable such as a telephone line.

Each of client terminals 204 such as a radio communication terminal or a handy cellular phone is associated with one of the first to M-th base stations $203_1$ to $203_M$ in accordance with a location of each of the client terminals 204. Specifically, each of the client terminals 204 transmits voices and/or data to or receives voices and/or data from the associated base station in radio communication.

Figure 3:
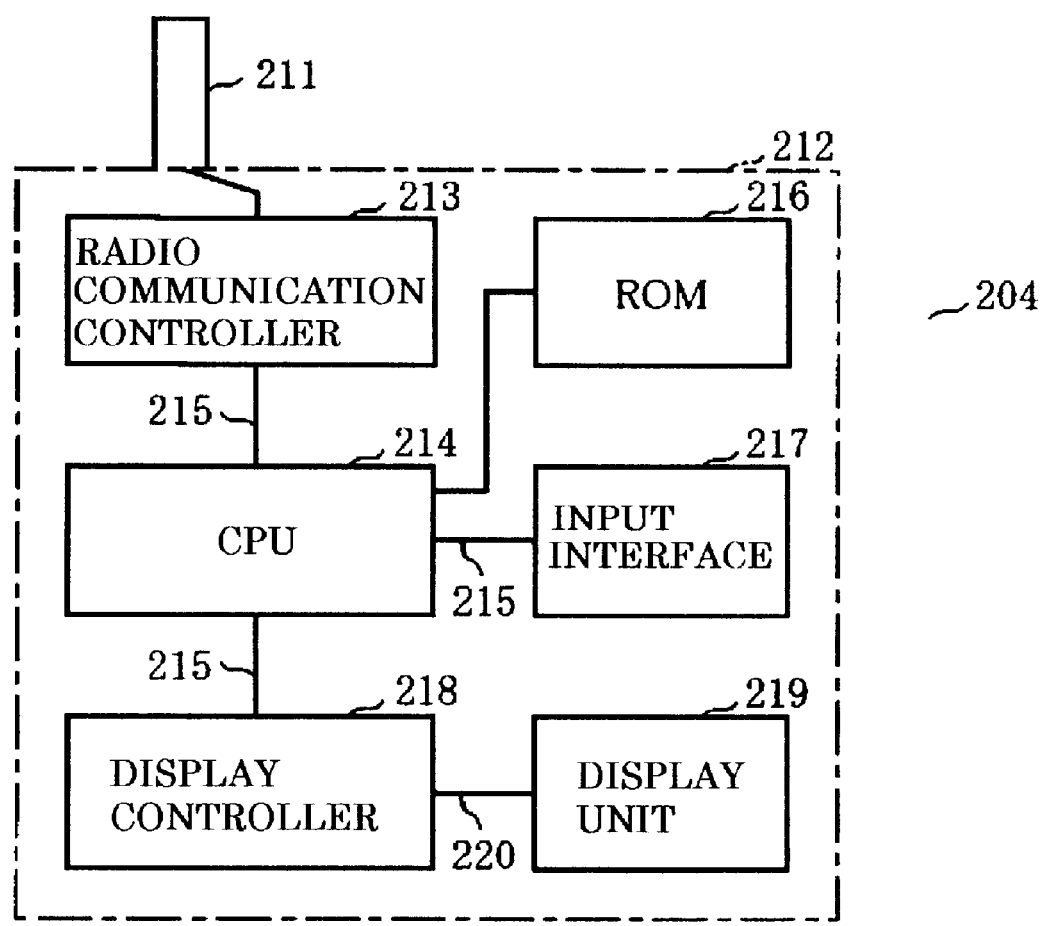
FIG. 3 is a block diagram of a client terminal in the embodiment.

FIG. 3 is a block diagram of the client terminal 204. The client terminal 204 is comprised of an antenna 211, a radio communication controller 213, a central processing unit (CPU) 214, a read only memory (ROM) 216, an input interface 217, a display controller 218, and a display unit 219.

The antenna 211 projects out of a terminal body 212, and is electrically connected to the radio communication controller 213.

The radio communication controller 213 includes a circuit for transmitting and receiving radio signals, and an interface circuit for controlling transmission and receipt of radio signals. The radio communication controller 213 is electrically connected to the CPU 214 through a bus 215.

The CPU 214 is electrically connected not only to the ROM 216, but also to other memories (not illustrated), and accomplishes performances of a cellular phone by carrying out a control program stored in the ROM 216. The CPU 214 is electrically connected to the input interface 217 and the display controller 218 through buses 215.

The input interface 217 is comprised of an input device such as a keyboard, and an interface circuit transmitting commands input through the input device, to the CPU 214 through a bus 215.

The display controller 218 is electrically connected to the display unit 219 such as a liquid crystal display through a cable 220, and causes the display unit 219 to display visual data thereon in accordance with image data transmitted from the CPU 214 through a bus 215.

Figure 4:
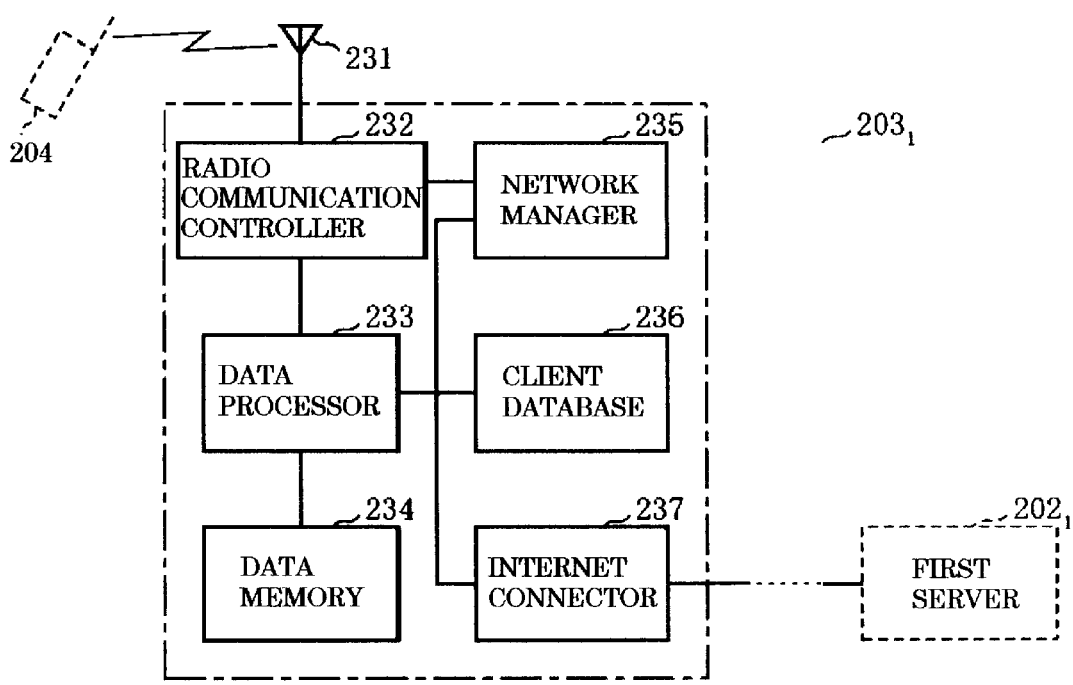
FIG. 4 is a block diagram of a base station in the embodiment.

FIG. 4 is a block diagram illustrating a structure of the first to M-th base stations $203_1$ to $203_M$. Since the first to M-th base stations $203_1$ to $203_M$ have the same structure, hereinbelow is explained only the first base station $203_1$ which makes radio communication with the client terminal 204.

The first base station $203_1$ is comprised of an antenna 231 making radio communication with the client terminal 204, a radio communication controller 232 to which the antenna 231 is electrically connected, a data processor 233, a data memory 234, a network manager 235, a client database 236, and an internet connector 237.

The radio communication controller 232 includes a circuit for making radio communication and an interface circuit for controlling radio communication, and is electrically connected to the data processor 233.

The data processor 233 includes a circuit comprised of CPU, ROM and RAM (all not illustrated), for controlling an operation of the first base station $230_1$. Data and programs for controlling an operation of the first base station $230_1$ are stored in the ROM. The first base station $230_1$ may be designed to include other storage mediums such as a magnetic disc for storing control programs therein.

The data memory 234 temporarily stores various data.

The data processor 233 is electrically connected to and controls the data processor 234, the network manager 235, the client database 236 and the internet connector 237.

The network manager 235 manages data transmission and receipt for all of the client terminals 204 to which the radio communication controller 232 transmits data and from which the radio communication controller 232 receives data.

The client database 236 stores a database available for management carried out by the network manager 235. Accordingly, the client database 236 can share a hardware with the data memory 234.

The internet connector 237 is comprised of a circuit which connects the first base station $203_1$ to the first server $202_1$ through the internet network 201.

Since the first to N-th servers $202_1$ to $202_N$ have the same structure as that of an ordinary computer connected to a line, a structure of the first to N-th servers $202_1$ to $202_N$ will not be explained.

On receiving a request based on a hypertext transfer protocol (HTTP), the first to N-th servers $202_1$ to $202_N$ transmit data accordingly. Herein, a hypertext transfer protocol (HTTP) is a communication protocol used for transmitting and receiving HTML data between the first to N-th servers $202_1$ to $202_N$ each acting as a world wide web (WWW) and each of the client terminals 204. A hypertext transfer protocol is a quite simple protocol consisting of a request and a response, wherein each of a request and a response is a unit in communication.

Figure 5:
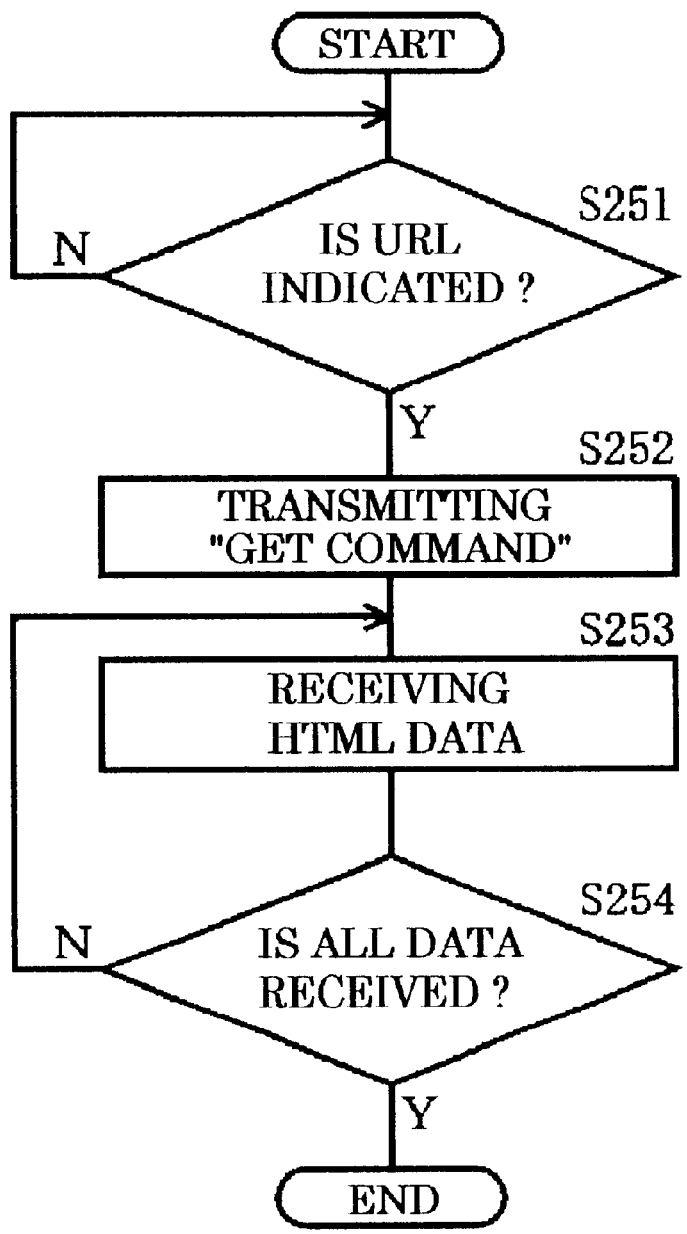
FIG. 5 is a flow chart showing steps to be carried out in the client terminal in the radio network communication system in accordance with the embodiment.

FIG. 5 is a flow chart showing steps carried out by the client terminal 204 in the radio network communication system. Hereinbelow, it is assumed that a user of the client terminal 204 makes access to a homepage in the first server $202_1$ through the first base station $203_1$.

While a browser which is a software for accessing a homepage is active, a user of the client terminal 204 inputs a uniform resource locator (URL) of the homepage through the input interface 217. Herein, a uniform resource locator is address data indicative of a site of an object in an internet. An object includes a file, a news group, a Telnet site and other tools and resources.

It is not always necessary for a user to input a uniform resource locator through the input interface 217. A user may search a desired homepage by keyword retrieval to thereby indicate a uniform resource locator of the homepage, or indicate a desired uniform resource locator by selecting the uniform resource locator through a history of making access to uniform resource locators. As an alternative, a user may use a storage medium such as a floppy disc or a compact disc to which uniform resource locators are stored, and make direct access to a desired uniform resource locator among those uniform resource locators.

When a user of the client terminal 204 inputs a uniform resource locator to thereby request making access to a desired homepage in step S251, the CPU 214 causes the radio communication controller 213 to transmit data in the form of "Get command" in accordance with a hypertext transfer protocol through the antenna 211 as a request, in step S252.

One of examples of "Get command" described in HTTP description is as follows.

Get index. html HTTP/1.0       (A)

Thereafter, the client terminal 204 receives HTML data from the first base station $203_1$, in step S253. When the client terminal 204 receives all HTML data associated with the indicated URL, or when receipt of HTML data is interrupted before the client terminal 204 receives all HTML data associated with the indicated URL (YES in step S254), receipt of HTML data is finished at that time.

If a user indicates another URL, steps S251 to S254 are carried out again.

Figure 6:
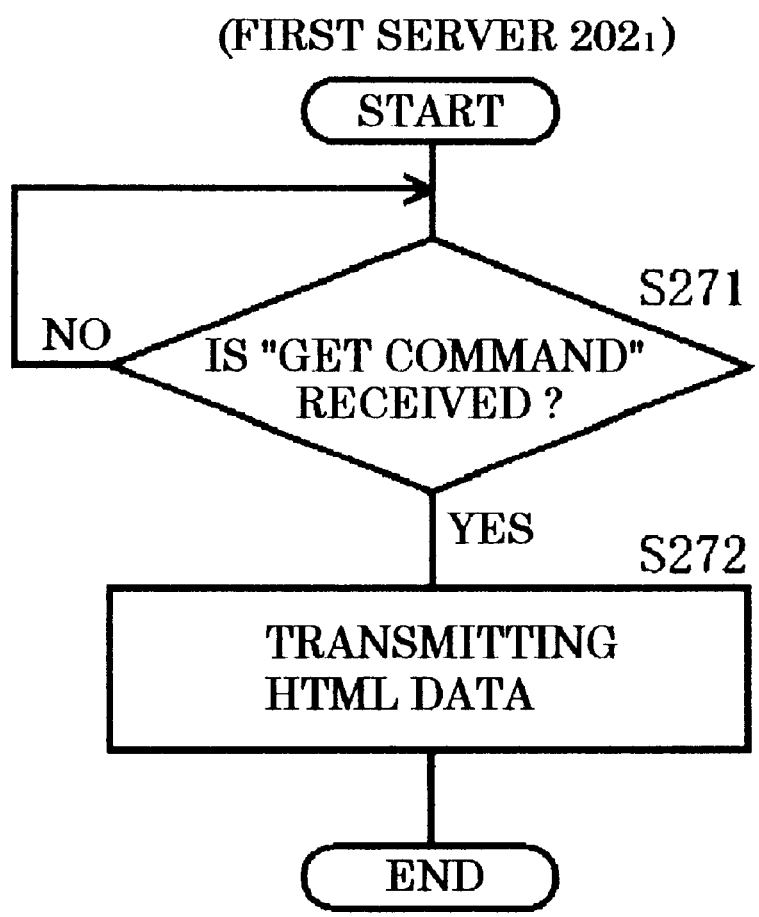
FIG. 6 is a flow chart showing steps to be carried out in a server when the client terminal makes access to a homepage.

FIG. 6 is a flow chart showing steps carried out by the first server $202_1$ when a user of the client terminal 204 makes access to a desired homepage.

When the first server $202_1$ receives "Get command" from the client terminal 204 through the first base station $203_1$ (YES in step S271), the first $202_1$ transmits the HTML data associated with the indicated URL, to the first base station $203_1$ (step S272).

When a user of the client terminal 204 does net-surfing, a user frequently changes URL, and "Get command" is transmitted each time a user changes URL, in which case, steps S271 and S272 are carried out each time "Get command" is received in the first server $202_1$.

Figure 7:
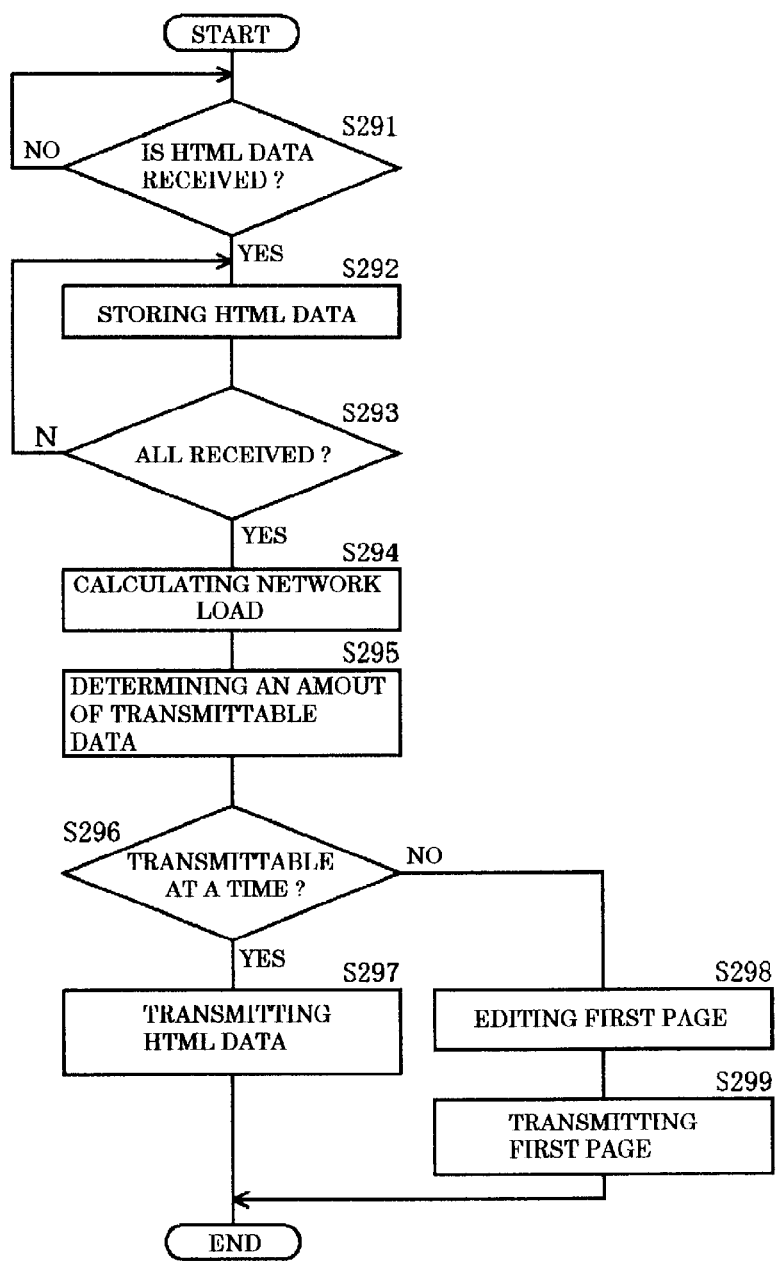
FIG. 7 is a flow chart showing steps to be carried out in the first base station when the client terminal makes access to a homepage.

FIG. 7 is a flow chart showing steps carried out by the first base station $203_1$ when the client terminal 204 makes access to a desired homepage.

When "Get command" is transmitted from the client terminal 204 to the first server $202_1$ in step S252 illustrated in FIG. 5, the first server $202_1$ transmits the HTML data to the first base station $203_1$.

The first base station $203_1$ is in a stand-by mode for waiting for receipt of the HTML data, in step S291.

When the first base station $203_1$ receives the HTML data (YES in step S291), the first base station $203_1$ stores the thus received HTML data in the data memory 234 illustrated in FIG. 4, in step S292.

When the first base station $203_1$ receives all the HTML data (YES in step S293), the first base station $203_1$ calculates a network load at that time in step S294. Herein, a network load is defined as a load between the first base station $203_1$ and the client terminal 204. A network load is dependent on the number of client terminals 204, communication status between the first base station $203_1$ and the client terminals 204, and other factors.

It is assumed hereinbelow that only one client terminal is connected to the first base station $203_1$. In such a case, it is considered that a communication load between the first base station $203_1$ and the client terminal 204 is quite small. Accordingly, the first server $202_1$ is allowed to transmit all the HTML data requested by the client terminal 204, at a time to the client terminal 204. This is because no harmful influence is exerted on other client terminals in such a circumstance. Under the above-mentioned assumption, the first base station $203_1$ can transmit a maximum amount of data to the client terminal 204.

In contrast, it is assumed hereinbelow that the maximum number of client terminals are connected to the first base station $203_1$. In such a case, a limited amount of data is assigned to each of channels. Accordingly, if a certain client terminal downloads a large amount of data per a unit time, other client terminals connected also to the first base station $203_1$ can download only a limited amount of data thereto.

Hence, if a lot of client terminals are connected to the first base station $203_1$, the first base station $203_1$ divides the HTML data into a minimum amount of data, and transmits the thus divided data to each of the client terminals 204. Before transmission of the divided data, the first base station $203_1$ receives data regarding a size of a screen at which each of the client terminals 204 can display data at a time, from the client database 236, and transmits the divided data by pages where each of the pages has the above-mentioned size of a screen.

As a result, an amount of data per one transmission is reduced, ensuring that a network load is reduced.

Under the above-mentioned concept, in the embodiment, an amount of data transmittable to the client terminal 204 is determined, in step S295.

Then, it is judged whether the HTML data associated with the indicated URL, stored in the data memory 234, is in an amount transmittable at a time to the client terminal 204, in step S296.

If it is judged that an excessive load is not exerted on the internet network 201 even if the HTML data stored in the data memory 234 is transmitted at a time to the client terminal 204 (YES in step S296), the HTML data is transmitted at a time to the client terminal 204, in step S297. What is done in step S297 is the same as what was conventionally done.

In contrast, when it is not possible to transmit data only to specified client terminal or terminals 204 (NO in step S296), for instance, because a lot of the client terminals 204 request the first base station $203_1$ to transmit the HTML data thereto, the first base station $203_1$ receives data relating to a display capacity of each of the client terminals 204, from the client database 236. Then, the first base station $203_1$ edits a first page in accordance with a display capacity of the client terminal 204, in step S298.

Herein, a display capacity indicates an amount of data or a size of data which the display unit 219 in each of the client terminals 204 can display at a time. For instance, when characters are to be displayed, the display unit 219 has a display capacity for displaying A×B characters at most. A display capacity of each of the client terminals 204 is stored in the client database 236.

As mentioned above, the first base station $203_1$ checks a display capacity of each of the client terminals 204, and edits pages in accordance with a display capacity of each of the client terminals 204. Then, the first base station $203_1$ transmits the thus edited one page to the client terminal 204, in step S299.

When the client terminal 204 makes a request to the first base station $203_1$ to further transmit the HTML data, the second or later pages are edited by the first base station $203_1$ in the same manner as mentioned above, and then, are transmitted to the client terminal 204.

Hereinbelow is explained in detail the step S298 where a page is edited in accordance with a display capacity of each of the client terminals 204.

FIG. 8 illustrates an example of HTML data stored in the first server $202_1$. The HTML data 321 stored in the first server $202_1$ and to be downloaded to the client terminal 204 has a text including 28 lines, and is not yet divided into pages.

It is assumed hereinbelow that the display unit 219 of the client terminal 204 requesting to download the HTML data 321 has a display capacity of 10 characters×10 lines. Under such assumption, the HTML data 321 illustrated in FIG. 8 is divided into first to third pages $322_1$ to $322_3$, and sentences in each of the first to third pages are compensated for.

FIG. 9 illustrates the first page $322_1$ having been compensated for. The first page $322_1$ of the HTML data 321 is designed to include a comment tag 323, <! START PAGE>, at a head thereof. The comment tag 323 indicates that this page is a first page among pages divided from the HTML data 321.

In addition, the first page $322_1$ of the HTML data 321 is designed to further include a comment tag 324, <! NEXT PAGE=2>, at a trail thereof. The comment tag 324 indicates that a next page exists and the next page is a second page.

FIG. 10 illustrates the second page 3222 having been compensated for. A N-th page $322_N$ of the HTML data 321, wherein N is an integer equal to or greater than 2, is designed to include a comment tag, <! PREVIOUS PAGE=N−1>, at a head thereof.

Since FIG. 10 illustrates the second page $322_2$, N is equal to 2. Accordingly, the second page $322_2$ is designed to include a comment tag 325, <! PREVIOUS PAGE=1>, at a head thereof.

Furthermore, pages except the first and last pages are designed to include a comment tag, <! NEXT PAGE=N+1>, at a trail thereof.

Since FIG. 10 illustrates the second page $322_2$, N is equal to 2. Accordingly, the second page $322_2$ is designed to include a comment tag 326, <! NEXT PAGE=3>, at a trail thereof.

FIG. 11 illustrates the third or last page $322_3$ having been compensated for. The third page $322_3$ of the HTML data 321 is designed to include a comment tag, <! PREVIOUS PAGE=2>, at a head thereof.

Since the third page $322_3$ is the last page in the HTML data 321, the third page $322_3$ is designed to include a comment tag 328, <! END PAGE>, at a rail thereof.

Figure 12:
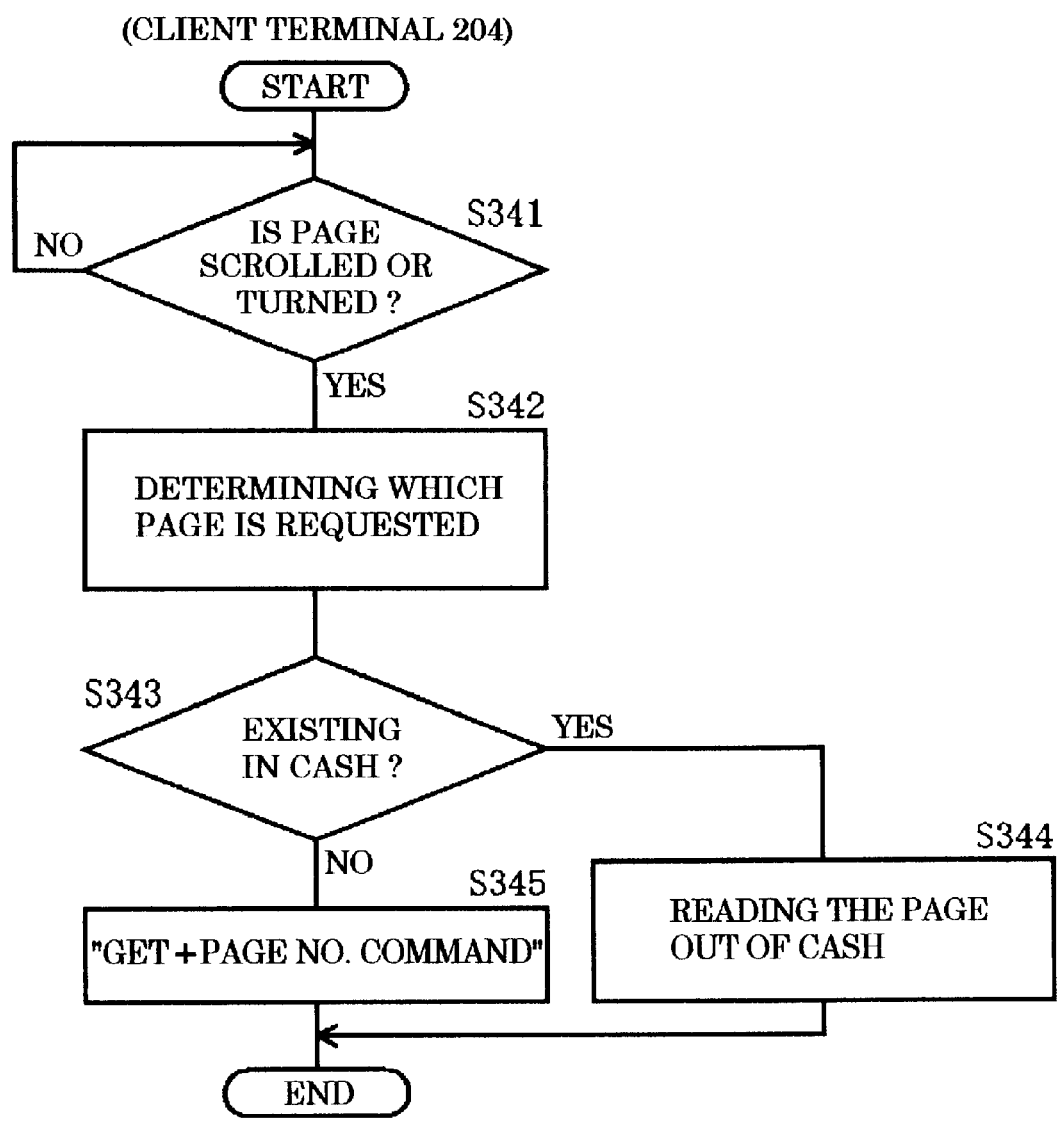
FIG. 12 is a flow chart showing steps to be carried out in the client terminal to receive HTML data by pages after a file was divided into sub-files or pages.

FIG. 12 is a flow chart showing steps to be carried out by the client terminal 204 to receive respective pages of the HTML data 321.

As having been mentioned before, in the conventional radio network communication system, HTML data associated with URL indicated by the client terminal 204 were transmitted at a time to the client terminal 204. In contrast, in the embodiment, HTML data is transmitted to the client terminal 204 in accordance with a display capacity of the client terminal 204. Hence, the client terminal 204 in the embodiment needs to receive the HTML data by each pages.

Referring to FIG. 12, when the client terminal 204 scrolls a page or turns a page by means of a cursor (YES in step S341), the CPU 214 analyzes HTML data now being displayed in the display unit 219, and determines which page is requested, in step S342. For instance, if a second page is presently displayed in the display unit 219 and a next page in the HTML data is requested by a user of the client terminal 204 through the input interface 217, what is requested is a third page. Similarly, if a second page is presently displayed in the display unit 219 and the previous page in the HTML data is requested by a user of the client terminal 204 through the input interface 217, what is requested is a first page.

Then, the CPU 214 checks whether the requested page is stored in a cash memory (not illustrated), in step S343.

For instance, if a second page is now being displayed in the display unit 219, a user of the client terminal 204 requests displaying a first page, and the first page has been stored in the cash memory as a page having already been displayed in the display unit 219 (YES in step S343), the first page is read again out of the cash memory, and then, displayed in the display unit 219, in step S344.

In contrast, for instance, when pages are successively displayed, specifically, when a first page is first displayed, and then, a second page is displayed, and so on, a third memory of HTML data is not yet stored in the cash memory. This is the same in a client terminal 204 in which previous pages of HTML data are not stored in a cash memory.

When a requested page is not stored in the cash memory (NO in step S343), the CPU 214 transmits "Get+Page No. command", in step S345. The "Get+Page No. command" is a command consisting of the above-mentioned "Get command" and an indication indicating which page is to be displayed.

Figure 13:
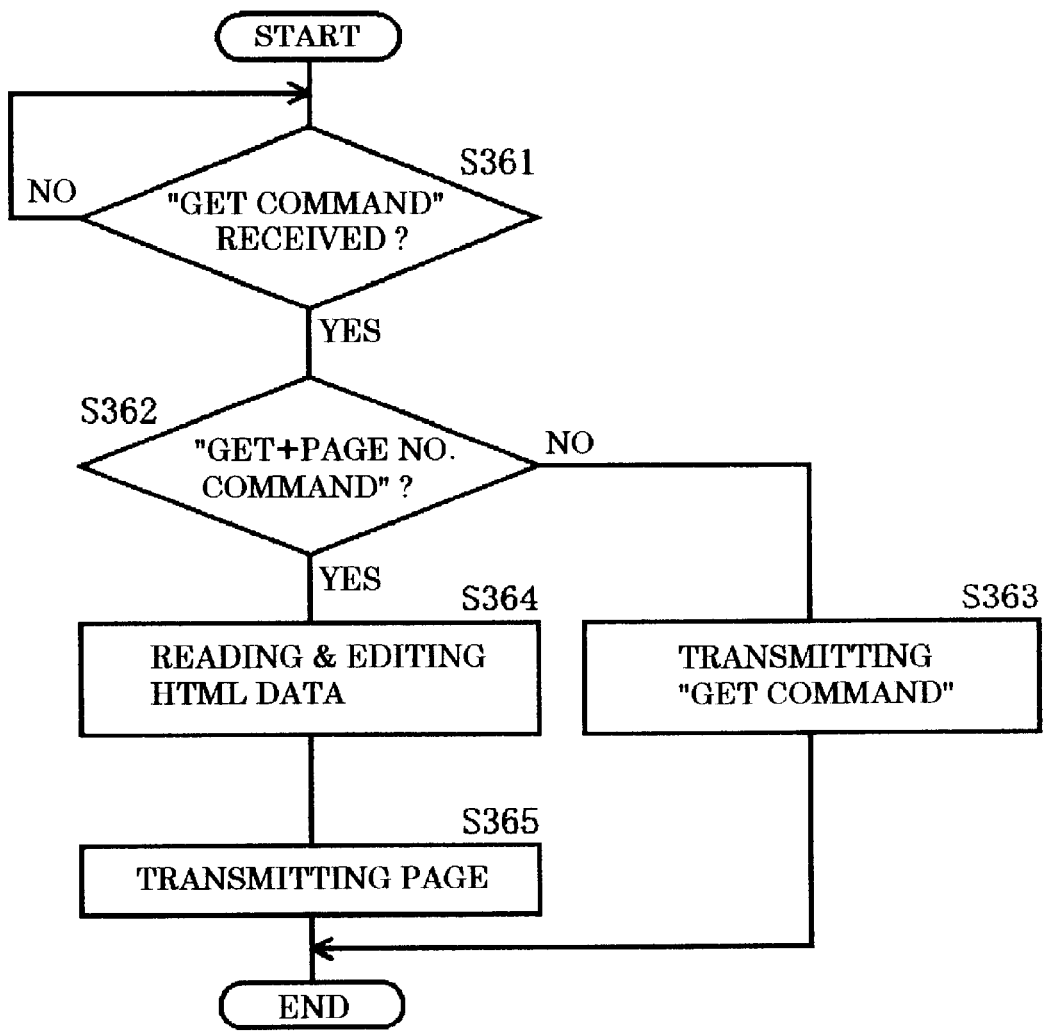
FIG. 13 is a flow chart showing steps to be carried out in the base station when the base station receives "Get command".

FIG. 13 is a flow chart showing steps to be carried out by the first base station $203_1$ on receipt of "Get command" from the client terminal 204.

When the first base station $203_1$ receives "Get command" (YES in step S361), the first base station $203_1$ judges whether the received command is "Get+Page No. command" or not, in step S362.

When the received command is "Get command" (NO in step S362), the first base station $203_1$ transmits the received "Get+command" to the first sever $202_1$, in step S363.

In contrast, when the received command is "Get+Page No. command" (YES in step S362), HTML data associated with the page indicated by "Get+Page No. command" has been already transmitted to the first base station $203_1$ (see step S272 in FIG. 6). Accordingly, the data processor 233 of the first base station $203_1$ reads HTML data associated with the page out of the data memory 234, and edits the thus read-out data, in step S364.

Then, the first base station $203_1$ transmits the thus edited HTML data to the client terminal 204, in step S365.

Figure 14:
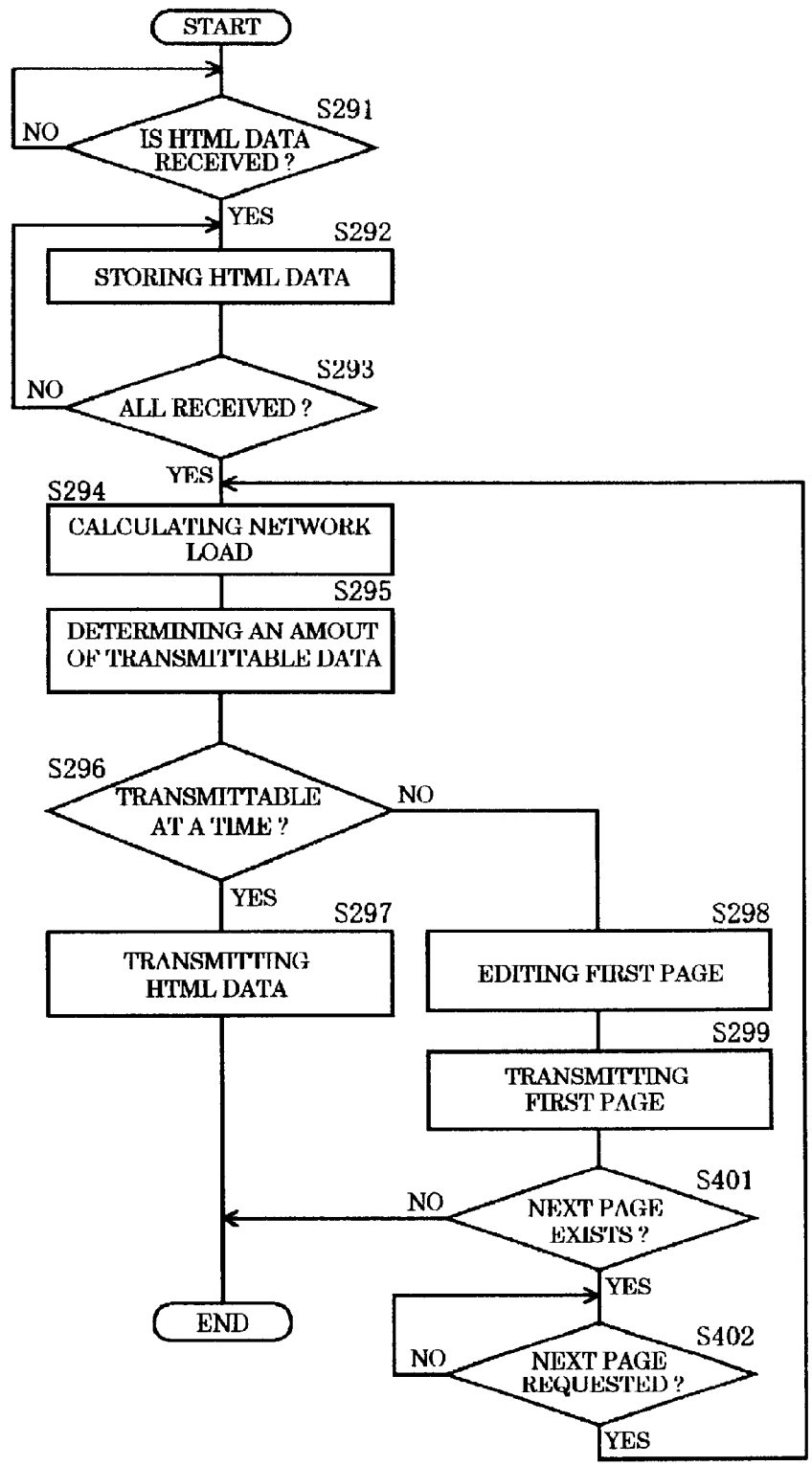
FIG. 14 is a flow chart showing steps to be carried out in the first base station when the client terminal makes access to a homepage.

FIG. 14 is a flow chart showing steps to be carried out by the first base station $203_1$ when the client terminal 204 makes access to a homepage, in accordance with a variant of the above-mentioned embodiment. Steps in FIG. 14 that correspond to the steps in FIG. 7 have been provided with the same reference numerals, and will not be explained.

Referring to FIG. 14, the same steps as the steps S291 to S299 having been explained in FIG. 7 are carried out.

After the first base station $203_1$ has edited a first page in accordance with a display capacity of the client terminal 204, in step S298, and transmitted the thus edited first page to the client terminal 204, in step S299, the first base station $203_1$ checks whether a next page of HTML data exists, in step S401.

If a next page exists (YES in step S401), the first base station $203_1$ waits for a request from the client terminal 204 to transmit thereto HTML data associated with the next page, in step S402.

When the client terminal 204 requests the first base station $203_1$ to transmit HTML data associated with the next page (S in step S402), a network load of the first base station $203_1$ towards each of the client terminals 204 is calculated, in step S294.

If a network load is small enough to transmit all HTML data to the client terminal 204 (YES in step S296), the rest of the HTML data having been already edited is transmitted at a time to the client terminal 204, in step S297.

If it is impossible to transmit the rest of the HTML data to the client terminal 204 (NO in step S296), the first base station $203_1$ edits only a page requested by the client terminal 204, in step S298, and then, transmits the thus edited page to the client terminal 204, in step S299.

Then, the first base station $203_1$ waits for receipt a request from the terminal station 204 to transmit HTML data associated with later page or pages.

In a second variant of the embodiment, which is explained hereinbelow, the number of pages transmittable at a time to the client terminal is determined, and then, HTML data associated with the thus determined pages is transmitted at a time to the client terminal 204.

Figure 15:
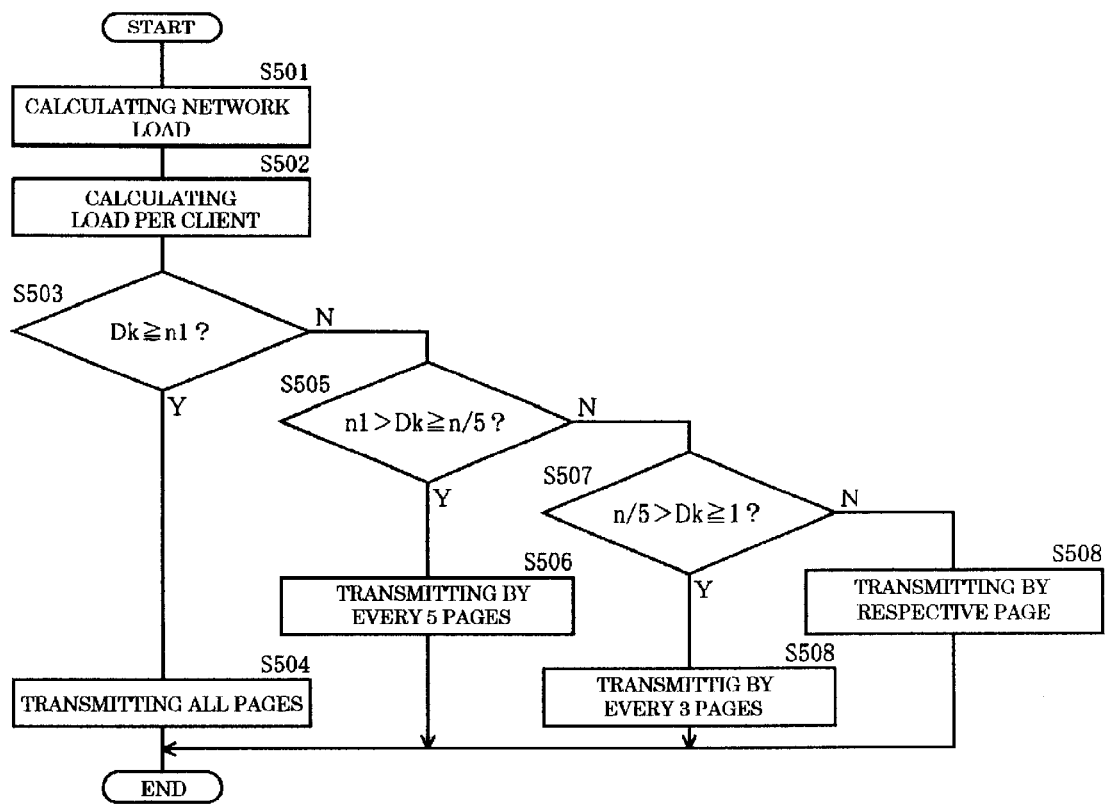
FIG. 15 is a flow chart showing steps to be carried out in the base station to determine the number of pages to be transmitted to the client terminal.

FIG. 15 is a flow chart showing steps to be carried out by the first base station $203_1$ when the client terminal 204 makes access to a homepage, in accordance with a second variant of the above-mentioned embodiment.

First, the steps S291 to S293 in FIG. 14 are carried out. Then, the first base station $203_1$ calculates a network load Dmax in each of channels, in step S501.

Then, the first base station $203_1$ calculates an allowable network load Dk per one client terminal in a channel assigned to the client terminal, in step S502.

Herein, the network load Dmax means a maximum amount of data transmittable at a time to each of client terminals from the first base station $203_1$, and the allowable network load Dk means an amount of data to be transmitted equally to each of the client terminals.

The allowable network load Dk is defined as follows:

$Dk=D\max/K$ wherein K indicates the number of client terminals concurrently making access to a homepage through the first base station $203_1$.

Then, the data processor 233 illustrated in FIG. 4 judges whether the allowable network load Dk is greater or smaller than HTML data associated with the number N of pages determined in accordance with a display capacity of the client terminal 204.

First, the data processor 233 judges whether the allowable network load Dk is equal to or greater than the number N of pages of a homepage to be downloaded to the client terminal, multiplied by 1, in step S503.

If the allowable network load Dk is judged equal to or greater than N×1 (YES in step S503), the internet network 201 can afford to transmit HTML data associated with all of the pages at a time to each of the client terminals. Hence, HTML data associated with all of the pages in URL indicated by the client terminal 204 is transmitted at a time to the client terminal, in step S504.

If the allowable network load Dk is judged smaller than N×1 (NO in step S503), but equal to or greater than N/5 (YES in step S505), it is possible to transmit HTML data associated with five pages, at a time to the client terminal 204. Hence, HTML data is transmitted to the client terminal 204 by every five pages, in step S506. If HTML data in the indicated URL corresponds to four or smaller pages, those pages are transmitted at a time to the client terminal 204.

If the allowable network load Dk is judged smaller than N/5 (NO in step S505), but equal to or greater than 1 (YES in step S507) (herein, it is assumed that the number of client terminals concurrently making access to the first base station $203_1$ is equal to or greater than 3), HTML data associated with four or smaller pages is transmitted to the client terminal 204 by every four or smaller pages, in step S508. In the second variant, HTML data is transmitted to the client terminal 204 by every three pages, in step S508.

In dependence on a circumstance, though the client terminal 204 may received a greater amount of data per a unit time from the first base station $203_1$ than an amount of data received in other client terminals, it would be possible to reduce a network load in comparison with a case where HTML data associated with all of pages is unconditionally transmitted at a time to a client terminal.

If the allowable network load Dk is judged smaller than 1 (NO in step S507), the first base station $203_1$ transmits HTML data to the client terminal 204 by one page per one transmission, in step S508.

In the above-mentioned embodiment and variants, HTML is selected as a language for describing a file or a homepage, other languages may be used.

The sub-files or divided pages may be edited or rewritten in a different way from the above-mentioned embodiment.

Though an amount of data transmittable to each of client terminals is determined based on an amount of data such as a character which a display unit in each of client terminals can display at a time, in the above-mentioned embodiment, an amount of data transmittable to each of client terminals may be determined based on other factors such as a capacity of a memory equipped in a client terminal or a rate at which a display unit in a client terminal displays data.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-335857 filed on Nov. 26, 1999 including specification, claims, drawings and summary is incorporated herein by reference in its entirety.

What is claimed is:

1. A radio network communication system comprising:
   (a) at least one server storing files therein;
   (b) at least one client terminal making a request to download a desired file thereto among said files stored in said server; and
   (c) at least one base station including:
      (c1) a data transceiver which makes radio-communication with said client terminal to receive data from and transmit data to said client terminal, and which, when said request is made by said client terminal, transmits said request to said server and receives all data constituting said desired file, from said server; and
      (c2) a load measurement unit which measures a network load between said client terminal and said base station,
   said base station dividing the received file into sub-files in accordance with said load measured by said load measurement unit, and transmitting each of said sub-files to said client terminal.

2. A radio network communication system comprising:
   (a) at least one server storing therein files each constituting a homepage, said files being stored in association with a uniform resource locator (URL) indicating a site of said homepage in an internet;
   (b) at least one client terminal making a request to download a desired file thereto among said files stored in said server, by indicating a uniform resource locator of said desired file; and
   (c) at least one base station including:
      (c1) a data transceiver which makes radio-communication with said client terminal to receive data from and transmit data to said client terminal, and which, when said request is made by said client terminal, transmits said request to said server and receives all data constituting said desired file, from said server; and
      (c2) a load measurement unit which measures a network load between said client terminal and said base station,
   said base station dividing the received file into sub-files in accordance with said load measured by said load measurement unit, and transmitting each of said sub-files to said client terminal.

3. The radio network communication system as set forth in claim 2, wherein said files are described in a descriptive language in which a homepage should be described, and wherein said base station further includes:
   (c3) a database storing therein data about a range in which a display unit of said client terminal can display data at a time;
   (c4) a divider which divides the received file into sub-files in the unit of a page; and
   (c5) an editor which edits said sub-files such that a descriptive language in each of said sub-files properly forms a page.

4. The radio network communication system as set forth in claim 3, wherein said base station further includes a transmitter which transmits said sub-files to said client terminal by pages applicable to a client terminal, in accordance with said network load measured by said load measurement unit.

5. The radio network communication system as set forth in claim 1, wherein said base station transmits the received files to said client terminal at a time, when said network load measured by said load measurement unit is equal to or smaller than a threshold load.

6. The radio network communication system as set forth in claim 3, wherein said client terminal includes:
   (b1) a detector which detects a request to display new pages on a display unit; and
   (b2) a transmitter which transmits said request to said base station.

7. A radio network communication system comprising:
   (a) an internet network;
   (b) first to N-th servers each storing homepages therein and each being in communication with said internet network, wherein N is an integer equal to or greater than 2;
   (c) first to M-th base stations each being in communication with said internet network, wherein M is an integer equal to or greater than 2, each of said first to M-th base stations including a memory to store data received from said servers therein;
   (d) client terminals each of which is accessible to said internet network through one of said base stations,
   each of said first to M-th base stations, on receiving a request from one of said client terminals to download a desired homepage to said one of said client terminals, receiving data from the associated server, and storing the thus received data in said memory,
   each of said first to M-th base stations calculating a load between itself and said one of said client terminals, and transmitting said data to said one of said client terminals by pages in accordance with said load.

8. A method of downloading data to a client terminal in a radio network communication system including at least one server, at least one client terminal and at least one base station, comprising the steps of:
   (a) said client terminal making a request to download a desired file thereto among said files stored in said server;
   (b) said base station receiving all data constituting said desired file, from said server;
   (c) calculating a network load between said client terminal and said base station;
   (d) said base station dividing the received file into sub-files in accordance with said load calculated in said step (c); and
   (e) said base station transmitting each of said sub-files to said client terminal.

9. A method of downloading data to a client terminal in a radio network communication system including at least one server, at least one client terminal and at least one base station, comprising the steps of:
   (a) said client terminal making a request to download a desired file thereto among said files stored in said server, by indicating a uniform resource locator (URL) of said desired file;
   (b) said base station receiving all data constituting said desired file, from said server which stores files each constituting a homepage, said files being stored in association with a uniform resource locator (URL) indicating a site of said homepage in an internet;
   (c) calculating a network load between said client terminal and said base station;
   (d) said base station dividing the received file into sub-files in accordance with said load calculated in said step (c); and (e) said base station transmitting each of said sub-files to said client terminal.

10. The method as set forth in claim 9, wherein said files are described in a descriptive language in which a homepage should be described, and said method further including the steps of:

said base station storing therein data about a range in which a display unit of said client terminal can display data at a time;

said base station dividing the received file into sub-files in the unit of a page; and said base station editing said sub-files such that a descriptive language in each of said sub-files properly forms a page.

11. The method as set forth in claim 10, further including the step of said base station transmitting said sub-files to said client terminal by pages applicable to a client terminal, in accordance with said network load calculated in said step (c).

12. The method as set forth in claim 9, wherein said base station transmitting the received files to said client terminal at a time, when said network load is equal to or smaller than a threshold load.

13. The method as set forth in claim 10, further including the step of said client terminal detecting a request to display new pages on a display unit; and transmitting said request to said base station.

14. A method of downloading data to a client terminal in a radio network communication system including at least one server, at least one client terminal and at least one base station, comprising the steps of:

(a) a user of said client terminal making a request to access to a homepage;

(b) said server transmitting data to said base station in accordance with said request;

(c) said base station storing said data in a memory;

(d) said base station calculating a network load between said base station and said client terminal;

(e) calculating an amount of data transmittable to said client terminal, in accordance with said load;

(f) comparing said data calculated in said step (e) to said data stored in said memory in said step (c); and (g) said base station transmitting said data to said client terminal, if an excessive load is not exerted on an internet network even if said data stored in said memory is transmitted to said client terminal at a time.

15. The method as set forth in claim 14, further comprising the step of determining the number of pages transmittable to said client terminal at a time, said base station transmitting said pages to said client terminal in said step (g).

16. A method of downloading data to a client terminal in a radio network communication system including at least one server, at least one client terminal and at least one base station, comprising the steps of:

(a) a user of said client terminal making a request to access to a homepage;

(b) said server transmitting data to said base station in accordance with said request;

(c) said base station storing said data in a memory;

(d) said base station calculating a network load between said base station and said client terminal;

(e) calculating an amount of data transmittable to said client terminal, in accordance with said load;

(f) comparing said data calculated in said step (e) to said data stored in said memory in said step (c);

(g) said base station editing a first page in accordance with a capacity at which said client terminal can display data at a time on a display unit thereof, if said data stored in said memory in said step (c) is greater in an amount than said data calculated in said step (e); and (h) said base station transmitting said first page to said client terminal.

17. The method as set forth in claim 16, further comprising the steps of:

(h) editing a second and later pages on receipt of a request from said client terminal; and (i) said base station transmitting the thus edited second or later pages to said client terminal.

18. A method of downloading data to a client terminal in a radio network communication system including at least one server, at least one client terminal and at least one base station, comprising the steps of:

(a) a user of said client terminal making a request to access to a homepage;

(b) said server transmitting data to said base station in accordance with said request;

(c) said base station storing said data in a memory;

(d) said base station calculating a network load between said base station and said client terminal;

(e) calculating an amount of data transmittable to said client terminal, in accordance with said load;

(f) comparing said data calculated in said step (e) to said data stored in said memory in said step (c);

(g) said base station editing a first page in accordance with a capacity at which said client terminal can display data at a time on a display unit thereof, if said data stored in said memory in said step (c) is greater in an amount than said data calculated in said step (e);

(h) said base station transmitting said first page to said client terminal;

(i) repeating said steps (d) to (f), when said client terminal requests said base station to transmit said client terminal data for next pages; and (j) said base station transmitting said data for next pages to said client terminal, if an excessive load is not exerted on an internet network even if said data for next pages is transmitted to said client terminal at a time.

19. The method as set forth in claim 18, further comprising the step of determining the number of pages transmittable to said client terminal at a time, said base station transmitting said pages to said client terminal in said step (j).

20. A method of downloading data to a client terminal in a radio network communication system including at least one server, at least one client terminal and at least one base station, comprising the steps of:

(a) a user of said client terminal making a request to access to a homepage;

(b) said server transmitting data to said base station in accordance with said request;

(c) said base station storing said data in a memory;

(d) said base station calculating a network load Dmax per a channel between said base station and said client terminal;

(e) said base station calculating an allowable load per a client terminal at said channel;

(f) said base station comparing Dk to the number of pages N of a homepage which said client terminal requests to download therein, wherein Dk is defined as follows:

$$Dk = Dmax/K$$

wherein K indicates the number of client terminals concurrently making access to a homepage; and (g) said base station transmitting all data of said homepage to said client terminal, if Dk is equal to or greater than N (Dk≧N).

21. A method of downloading data to a client terminal in a radio network communication system including at least one server, at least one client terminal and at least one base station, comprising the steps of:

(a) a user of said client terminal making a request to access to a homepage;

(b) said server transmitting data to said base station in accordance with said request;

(c) said base station storing said data in a memory;

(d) said base station calculating a network load Dmax per a channel between said base station and said client terminal;

(e) said base station calculating an allowable load per a client terminal at said channel;

(f) said base station comparing Dk to the number of pages N of a homepage which said client terminal requests to download therein, wherein Dk is defined as follows:

$$Dk = Dmax/K$$

wherein K indicates the number of client terminals concurrently making access to a homepage; and (g) said base station transmitting data of said homepage by every M pages to said client terminal, if Dk is smaller than N, but equal to or greater than N/M (N>Dk≧N/M), wherein M is an integer equal to or greater than 2 and smaller than said N.

22. A method of downloading data to a client terminal in a radio network communication system including at least one server, at least one client terminal and at least one base station, comprising the steps of:

(a) a user of said client terminal making a request to access to a homepage;

(b) said server transmitting data to said base station in accordance with said request;

(c) said base station storing said data in a memory;

(d) said base station calculating a network load Dmax per a channel between said base station and said client terminal;

(e) said base station calculating an allowable load per a client terminal at said channel;

(f) said base station comparing Dk to the number of pages N of a homepage which said client terminal requests to download therein, wherein Dk is defined as follows:

$$Dk = Dmax/K$$

wherein K indicates the number of client terminals concurrently making access to a homepage; and (g) said base station transmitting data of said homepage by every L pages to said client terminal, if Dk is smaller than N/M, but equal to or greater than 1 (N/M>Dk≧1), wherein M is an integer equal to or greater than 2 and smaller than said N, and L indicates an integer smaller than said M.

23. A method of downloading data to a client terminal in a radio network communication system including at least one server, at least one client terminal and at least one base station, comprising the steps of:

(a) a user of said client terminal making a request to access to a homepage;

(b) said server transmitting data to said base station in accordance with said request;

(c) said base station storing said data in a memory;

(d) said base station calculating a network load Dmax per a channel between said base station and said client terminal;

(e) said base station calculating an allowable load per a client terminal at said channel;

(f) said base station comparing Dk to the number of pages N of a homepage which said client terminal requests to download therein, wherein Dk is defined as follows:

$$Dk = Dmax/K$$

wherein K indicates the number of client terminals concurrently making access to a homepage; and (g) said base station transmitting data of said homepage by every one page to said client terminal, if Dk is smaller than 1.

* * * * *